D. A. GOODNOW.
Scythe Fastener.

No. 15,849.

Patented Oct. 7, 1856.

UNITED STATES PATENT OFFICE.

DAVID A. GOODNOW, OF BALDWINVILLE, MASSACHUSETTS.

IMPROVEMENT IN ATTACHING SCYTHES TO SNATHS.

Specification forming part of Letters Patent No. 15,849, dated October 7, 1856.

*To all whom it may concern:*

Be it known that I, DAVID ALLEN GOODNOW, of Baldwinville, in the county of Worcester and State of Massachusetts, have invented certain new and useful Improvements in Attaching Scythes to their Snaths, termed a "Scythe-Fastener;" and I do hereby declare that the following is a full, clear, and exact description of the same, reference being had to the accompanying drawings, and to the letters of reference marked thereon, in which—

Figure 1:
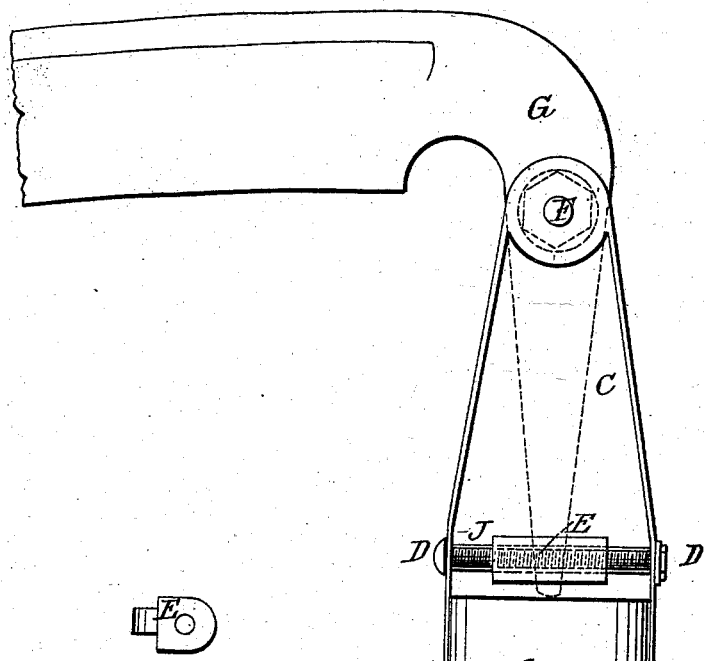
Figure 2:
Figure 2:
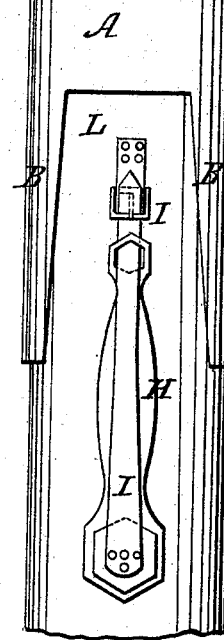

Figure 1 is a top view. Fig. 2 shows a side and end view of the nut E, the same letters denoting the same parts in each.

My improvement relates to the securing the scythe firmly to the snath, and making the angle therewith easily adjustable.

To construct my scythe-fastener, make the ring A, with its lips B B, and a projection, C, in which is fitted a screw at F, and a slide at J, in which the dog E slides. The sides of C are raised to form a support for the screw D and strengthen C. The dog E make with a notch, K, in the part projecting through the slide J, and a thread in it to fit the screw D. To the snath L attach the strap and buckle I, to hold the wrench H, which is fitted to the heads of the screws D and F. In the shank of the scythe G make a hole for the screw F, and fit the point to the notch K, (cutting off the nib, if made with one.)

The operation is: After fitting the end of the snath L into the lips B B and body of ring A, place the shank of the scythe on the under or outer side of C, with its end in the notch in E; put in the screw F, which holds it firmly to C, but allows it to turn when the dog E is moved by screw D, which adjusts the hang to suit the operator, the strap and buckle forming a ready, convenient way of carrying the wrench and keeping it close at hand when wanted.

It will be seen that I do not place the shank of the scythe on the snath, but dispense with so much of its length, thereby making the whole lighter; neither do I cut into the snath to fasten the whole, but leave it full strength.

What I claim as new, and desire to secure by Letters Patent, is—

The screw D and dog E, in combination with projection C, the whole being arranged in the manner and for the purpose substantially as described.

In testimony whereof I hereunto affix my signature in the presence of two witnesses.

DAVID ALLEN GOODNOW.

Witnesses:
SAML. A. ARNOLD,
JAS. G. ARNOLD.